(12) United States Patent
Buhl et al.

(10) Patent No.: US 6,511,084 B1
(45) Date of Patent: Jan. 28, 2003

(54) AXLE SUSPENSION OF RIGID AXLES

(75) Inventors: Reinhard Buhl, Bohmte (DE);
Wilfried Lustig, Hüde (DE); Werner Schmudde, Bersenbrück (DE)

(73) Assignee: ZF Lemförder Metallwaren (DE)

(*) Notice: Subject to any disclaimer, the term of this patent is extended or adjusted under 35 U.S.C. 154(b) by 0 days.

(21) Appl. No.: 09/674,746

(22) PCT Filed: Mar. 2, 1999

(86) PCT No.: PCT/DE99/00555
§ 371 (c)(1),
(2), (4) Date: Feb. 16, 2001

(87) PCT Pub. No.: WO00/51833
PCT Pub. Date: Sep. 8, 2000

(51) Int. Cl.$^7$ .......................... B60K 17/00; B60G 9/00; B60G 7/02; B60G 21/055
(52) U.S. Cl. ..................... 280/124.107; 280/124.116; 280/124.156; 280/124.177; 180/349; 180/352; 180/378
(58) Field of Search ............... 180/352, 378, 180/349; 280/124.116, 124.156, 124.107, 124.13, 124.177; 267/293, 294

(56) References Cited

U.S. PATENT DOCUMENTS

| | | | |
|---|---|---|---|
| 2,300,844 A | * 11/1942 | Olley | 180/349 |
| 2,582,775 A | 1/1952 | Giacosa | |
| 2,955,842 A | 10/1960 | Stump | |
| 3,666,301 A | * 5/1972 | Jorn | 267/282 |
| 3,869,015 A | * 3/1975 | Allison | 180/352 |
| 4,157,840 A | * 6/1979 | Kroniger et al. | 280/124.134 |
| 4,491,429 A | * 1/1985 | Matoba et al. | 267/154 |
| 4,667,974 A | * 5/1987 | Giese | 280/683 |
| 4,981,308 A | * 1/1991 | Kunert et al. | 267/293 |
| 5,340,220 A | * 8/1994 | Sprang et al. | 267/279 |
| 5,649,719 A | * 7/1997 | Wallace et al. | 180/352 |
| 5,711,544 A | * 1/1998 | Buhl | 280/124.106 |
| 6,231,264 B1 | * 5/2001 | McLaughlin et al. | 180/352 |

FOREIGN PATENT DOCUMENTS

| | | |
|---|---|---|
| DE | 767 180 | 5/1943 |
| DE | 92 18 307.7 | 1/1994 |
| EP | 0 544 122 | 6/1993 |
| EP | 0 650 858 A1 | 5/1995 |
| FR | 63211 | 9/1955 |
| FR | 1 174 803 | 3/1959 |
| FR | 1 193 105 | 10/1959 |
| GB | 919680 | 2/1963 |
| GB | 2 274 629 | 8/1994 |
| WO | WO 96/22896 | 8/1996 |

* cited by examiner

*Primary Examiner*—Paul N. Dickson
*Assistant Examiner*—Ruth Ilan
(74) *Attorney, Agent, or Firm*—McGlew and Tuttle, P.C.

(57) ABSTRACT

An axle suspension of rigid axles is presented, on the axle body (1) of which a steering triangle (2) as well as two longitudinal control arms (3, 4), which are located at spaced locations from the steering triangle and have different vertical positions, and additionally a stabilizing device (5) are arranged. The steering triangle has two control arms (2.1 and 2.2), which form an angle with one another and are fastened to a central joint (2.3), on the one hand, and are connected to the vehicle body via a guiding joint (2.4 and 2.5) each, on the other hand. The following geometric axes of coordinates are defined on the axle suspension: a first horizontal axis (12), which extends in the transverse direction of the vehicle and forms the central axis of the axle body (1) at the same time as well as a second horizontal axis (13), which extends in the center of the vehicle and in the longitudinal direction of the vehicle and intersects the axis (12) at right angles and a vertical axis (11) intersecting the intersection of the horizontal axes (12 and 13). The central joint (2.3) of the steering triangle (2) is mounted on the axle body with an offset from at least one of the axes (11 through 13).

19 Claims, 13 Drawing Sheets

AXLE SUSPENSION OF RIGID AXLES

FIELD OF THE INVENTION

The present invention pertains to an axle suspension of rigid axles for motor vehicles as they can be used predominantly in medium and heavy utility vehicles (UVs). Prior-art axle designs comprise usually a steering triangle fastened on the axle body above the rigid axle of the vehicle and a plurality: of longitudinal control arms arranged under the vehicle axle as well as additional stabilizing device. The steering triangle has two control arms, which form an angle with one another and are fastened to a central joint, on the one hand, and are connected via a guiding joint to the vehicle body, on the other hand. As is known, mostly molecular joints are used as the joints.

BACKGROUND OF THE INVENTION

The housing for the differential is frequently integrated on the axle body, approximately in the middle of the axle. The fastening of the central joint of the steering triangle is then additionally arranged on this housing, so that an unusually large space must be made available for installation for the axle suspension. This is no longer acceptable in the manufacture of modern automobiles and especially in the case of low-platform vehicles.

SUMMARY AND OBJECTS OF THE MENTION

The basic technical object of the present invention is to provide an axle suspension of rigid axles which requires a smaller space for installation than do prior-art embodiments while the stability of the vehicle is increased and it makes it at the same time possible to reduce the tendency of the vehicle to rolling and rocking.

Furthermore, it is an object of the invention to provide an axle suspension that is maintenance-friendly and that is able to be manufactured and installed in a simple manner. It is still another object of the invention to use standardized components where practical.

According to the invention, an axle suspension of rigid axles is provided on an axle body. The suspension includes a steering triangle as well as two longitudinal control arms located at spaced locations from the steering triangle, the two longitudinal control arms having different vertical positions. A stabilizing device is provided. The two control arms form an angle with one another and are fastened to a central joint and are each connected to the vehicle body via a guiding joint. The geometric axes of coordinates of the axle suspension is such that a first horizontal axis extending in the transverse direction of the vehicle and forms the central axis of the axle body at the same time. A second horizontal axis extends in the center of the vehicle and in the longitudinal direction of the vehicle and intersects the first horizontal axis at right angles. A vertical axis intersects the intersection of the two horizontal axes. The central joint of the steering triangle and/or the fastening of at least one of the longitudinal control arms are mounted on the axle body with an offset in relation to at least one of the two horizontal axes and the vertical axis.

The geometric axes of coordinates defined on the axle suspension provide a better understanding of the relationship between features of the invention. The first horizontal axis, which extends in the transverse direction of the vehicle and also forms the central axis of the axle body, and the second horizontal axis, which extends in the center of the vehicle and in the longitudinal direction of the vehicle intersect at a point M where the first horizontal axis extends at right angles to the second horizontal axis. The vertical axis intersects this crossing point M of the horizontal axes. The central joint of the steering triangle and/or the fastening of at least one of the longitudinal control arms are mounted to the rigid vehicle axle according to the present invention on the axle body with an offset from at least one of these axles.

"Offset" is defined here as any deviation from the central arrangement of the central joint. However, the offset may also assume the value zero when the central joint is fastened, e.g., centrally on the axle body. However, embodiments in which a differential is present on the axle and the central joint is arranged laterally on this housing of the differential are possible as well. The central joint is now quasi in an "oblique position."

According to the present invention, each molecular joint comprises a cylindrical or spherical metallic inner part, whose fastening pins project from the housing on both sides. A molecularly deformable elastomer body adhering to the two components is arranged between the housing and the inner part.

However, at least one of these two adhesive connections is able to slip through when a maximum allowable shear stress is exceeded, so that destruction of the elastomer body and consequently of the joint due to over stressing is effectively prevented from occurring. Adhesive connection is consequently. Defined according to the present invention as an adhesive, but detachable connection.

However, slide bearings or pivoting slide bearings may also be used besides the molecular joints.

To make it possible to manufacture the entire vehicle axle with a small number of individual parts and to correspondingly reduce the manufacturing and assembly efforts, it is advantageous to make the mounting flange, which receives the central joint of the steering triangle, in one piece with the axle body.

The central joint of the steering triangle is regularly connected detachably to the mounting flange.

Corresponding to another embodiment of the present invention, it is suggested that the connection between the mounting flange and the central joint be designed as a screw connection, which has, e.g., elongated holes at the fastening pins of the central joint to compensate tolerances.

The central joint and the guiding joints are preferably designed as molecular joints. They may be fastened according to various arrangements. For example, the inner part of the central joint may be fixed axially parallel to the horizontal axis on the axle body, which axis also forms the central axis of the axle body, or at least one of the joints is arranged coaxially or axially in parallel to a vertical axis on the vehicle. Furthermore, each joint may form an angle with this vertical axis when projected into a common plane.

Corresponding to another embodiment of the present invention, at least one of the joints comprises a metallic housing with a cylindrical inner jacket, a metallic inner part and an elastomer body arranged between the two. This compensates axial, radial and cardiac movements of the housing and of the inner part relative to one another by molecular deformation, and the elastomer body cooperating with the cylindrical inner jacket of the housing in the outward direction is adheringly arranged on the inner part and is axially pretensioned between sheet metal rings and has a crowned jacket surface geometry centrally all around and a fitted jacket surface geometry next to it on both sides all around in the preassembled, axially stress-free state, wherein the external diameter of the sheet metal rings has an undersize compared with the internal diameter of the inner jacket of the housing and a sliding surface on the circumference of the elastomer body, which sliding surface is formed under the axial tensioning and cooperates with the cylindrical inner jacket surface of the housing, allows a rotary movement of the inner part in the housing, so that the inner part slips through under overload.

Destruction and the associated premature failure of the joint and consequently of the vehicle axle is thus prevented from occurring in a simple manner.

However, depending on the vehicle axle characteristic to be achieved and in light of a soft spring characteristic, it is also possible to use in an axle suspension according to the present invention molecular joints whose housing is provided with a recess arranged inside the main load zone. The radial direction is to be considered to be the principal direction of loading in these molecular joints. The torsional loads as well as the possible cardiac (angular) deflections are rather unsubstantial and are hardly changed by a joint design according to the present invention. Such molecular joints have a ball piece as the inner part. A thicker rubber layer is applied between the inner wall of the housing and the ball surface due to a recess in the joint housing in the equatorial area of the ball piece. Since the rubber has damping properties, i.e., it is "soft," such a joint has a softer spring characteristic at the beginning of its radially acting load. However, the more the rubber is compressed, the more strongly will it be pressed against the housing wall. The characteristic of the joint thus becomes harder with increasing radial spring travel.

The elastomer body may be a one-layer or multilayer elastomer body according to the present invention and may optionally have inserts consisting of metal or plastic.

According to the present invention, the steering triangle may be a one-part component made of plastic, fiber-reinforced plastic, magnesium, aluminum or steel, in whose mounts, which are prepared for this purpose, the molecular joints are inserted.

To better meet the mounting requirements, the control arms of the steering triangle may also have different lengths. It is thus possible, e.g., to mount the central joint laterally next to the differential.

Moreover, advantages arise in terms of mounting from the fact that at least one of the longitudinal control arms or of the control arms of the steering triangle is bent at right angles in the area of the guiding joints and/or of the central joint, so that the central longitudinal axis of the control arm or of the control arms and the central axis of the guiding joint are offset in space in relation to one another. The steering triangle may also have arc-shaped control arms, as a result of which steering triangle designs in which the angle formed by the control arms is greater than 60° are possible.

According to the present invention, the steering triangle may also comprise two control arms connected to one another in the area of the central joint, where a two-part housing is used which receives the central joint in the form if a molecular joint. The housing parts are characterized by an assembly connection. Torsional movement of the housing parts in relation to one another is possible.

The above-mentionhed features of the present invention and the features yet to be explained below can, of course, be used not only in the specific combination indicated, but in other combinations or alone as well without going beyond the scope of the present invention.

Some exemplary embodiments of the axle suspensions of rigid axles according to the present invention will be explained in greater detail below with reference to the drawings.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
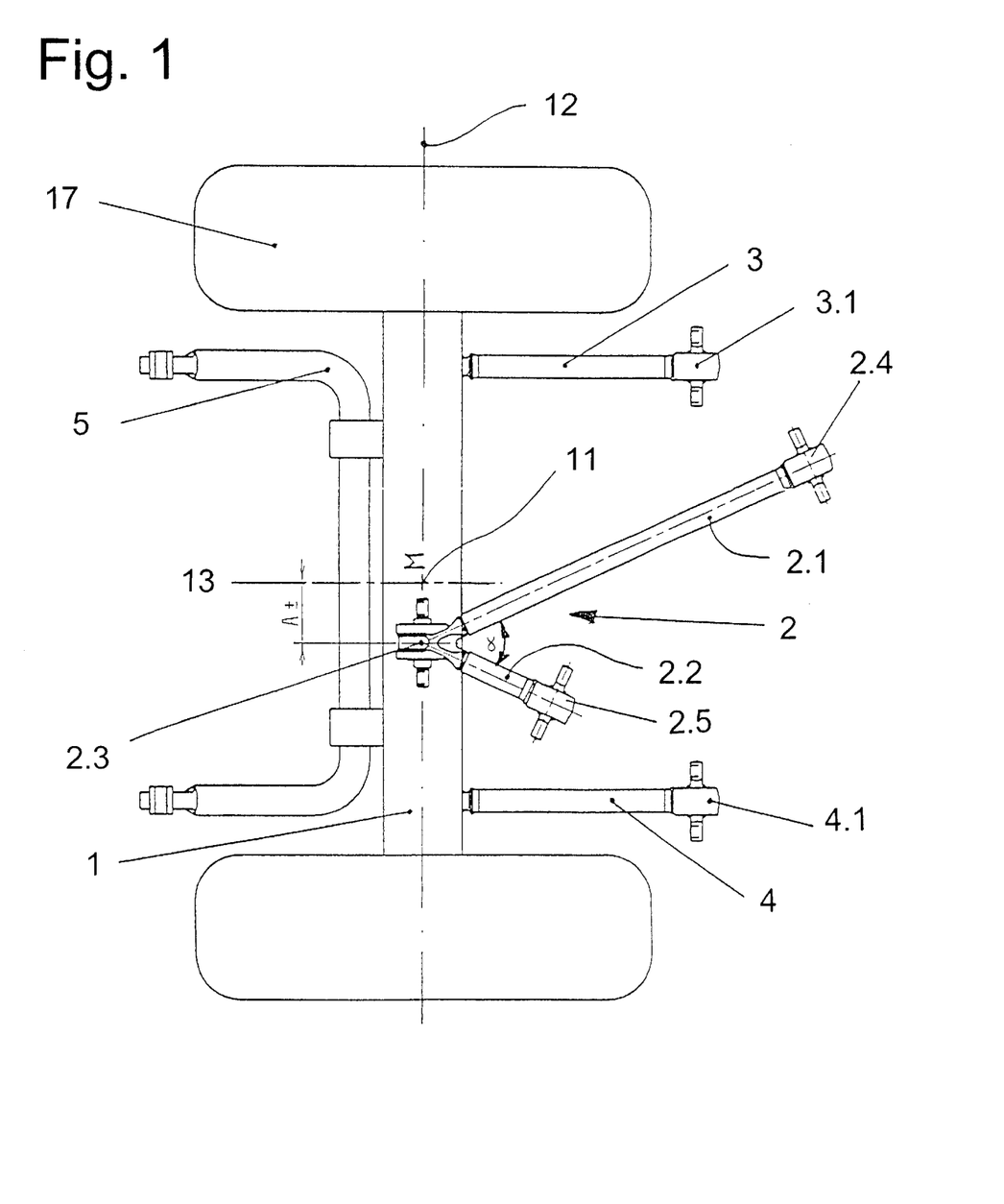
FIG. 1 is a top view of an axle suspension of a rigid axle according to the present invention.
Figure 2:
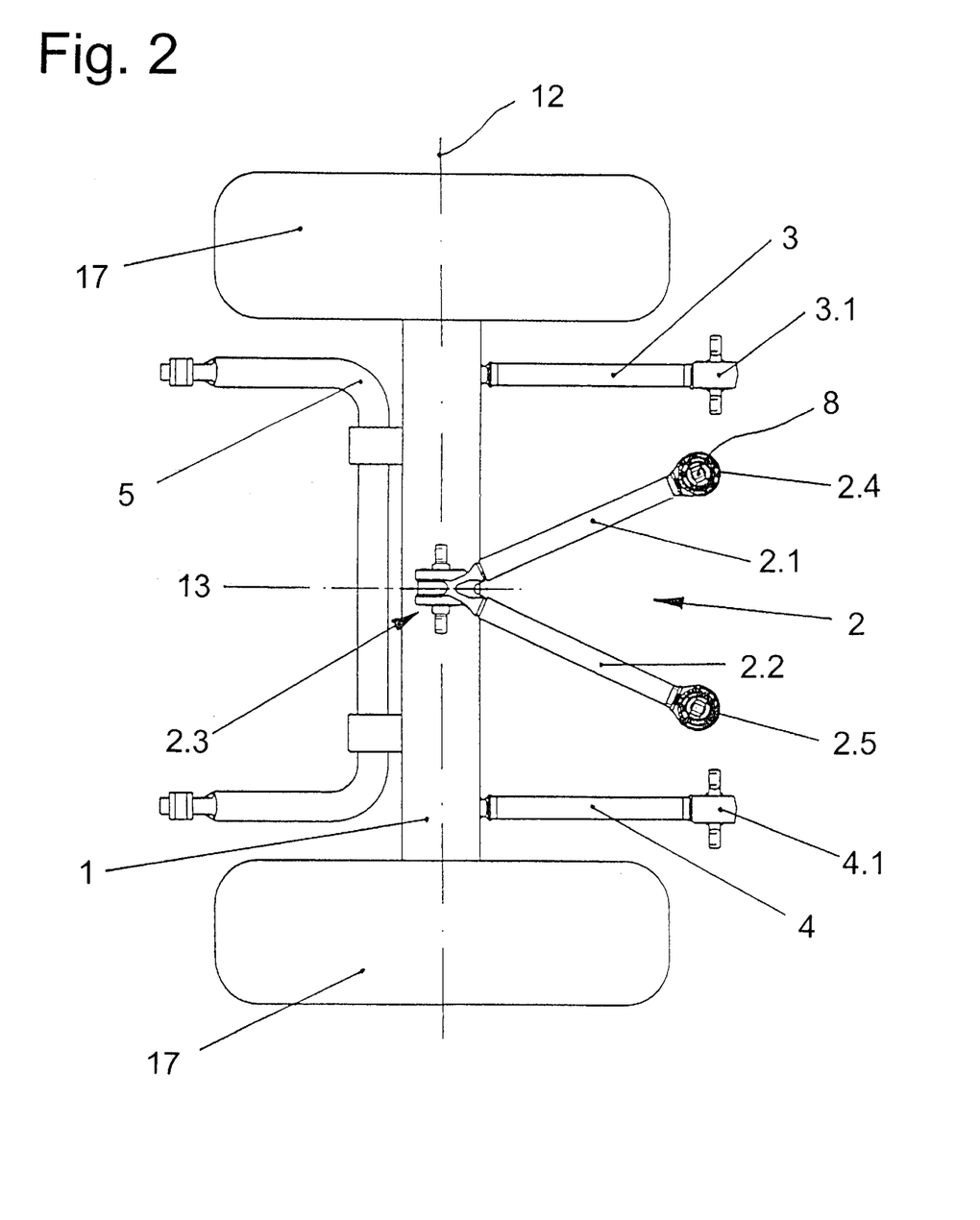
FIG. 2 is a top view of another axle suspension of a rigid axle according to the present invention.
Figure 3:
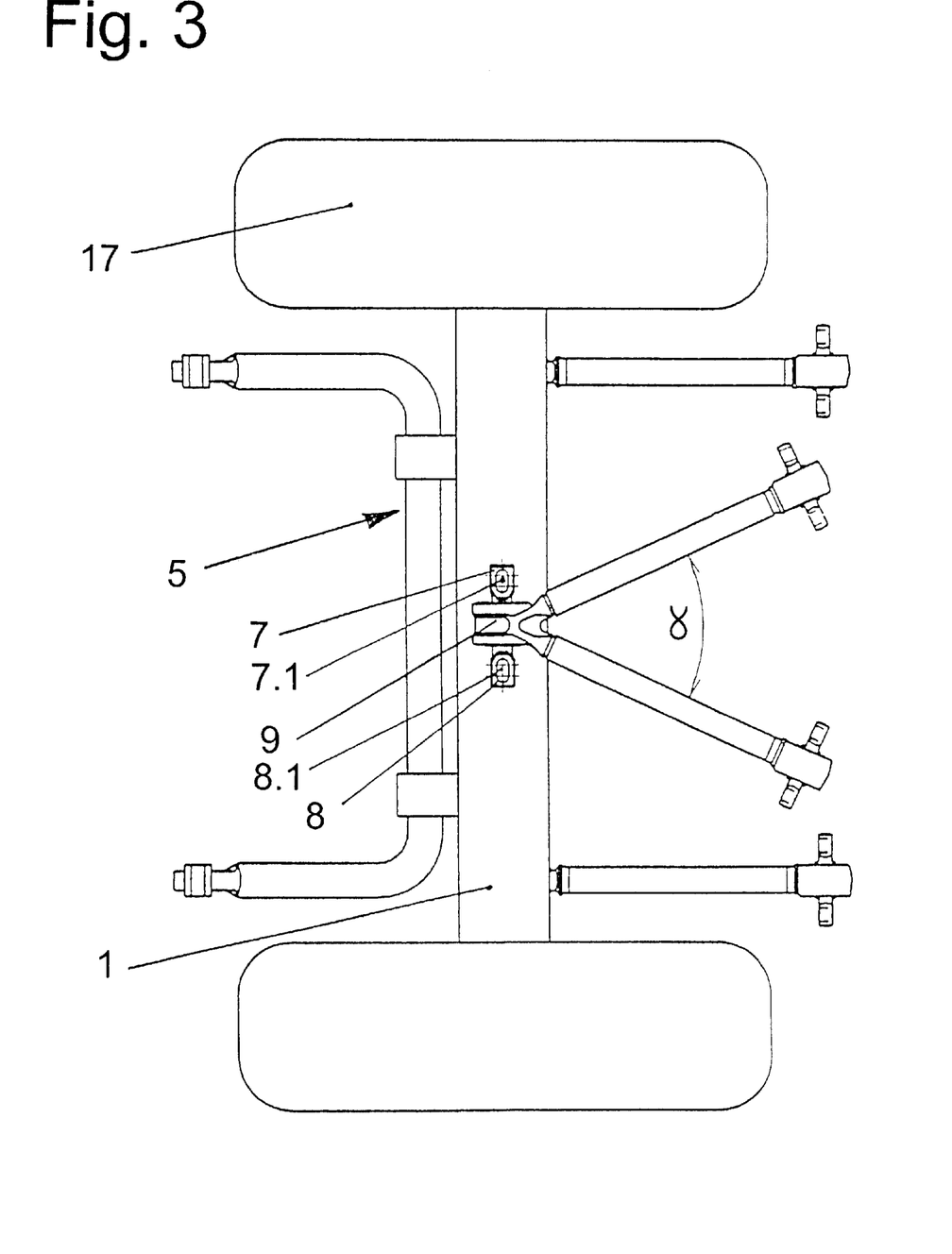
FIG. 3 is a top view of another axle suspension of a rigid axle according to the present invention.

Referring to the drawings in particular, FIGS. 1 through 3 show axle suspensions of rigid axles according to the present invention,which have specific peculiarities, even though their basic design is similar. The figures show axle suspensions of rigid axles on the axle body 1 of which a steering triangle 2 as well as two longitudinal control arms 3,4, which are located at spaced locations from the steering triangle and have different vertical positions, and an additional stabilizing device 5 are arranged. The steering triangle 2 has two control arms 2.1 and 2.2, which form an angle a with one another and are fastened to a central joint 2.3, on the one hand, and are connected to the vehicle body via a guiding joint 2.4 and 2.5 each, on the other hand. The longitudinal control arms 3, 4 have a molecular joint 3.1, 3.2 and 4.1, 4.2 each on both sides. Each molecular joint comprises a metallic inner part 6, whose fastening pins 7, 8 project from the housing 9 on both sides. A molecularly deformable elastomer body, which adheres to both components, is located between the housing 9 and the inner part 6, and at least one of these two adhesive connections slips through when a maximum allowable shear stress is exceeded. The central joint 2.3 of the steering triangle 2 is mounted on the axle body with an offset in relation to at least one of the axes 11 through 13. In FIG. 1, the central joint 2.3 is arranged on the axle body I offset axially in parallel to the first horizontal axis 12 and in the direction of this axis 12. The offset in this case is the distance between the central joint 2.3 and the vertical axis 11 and is designated by "A" in the figure. The geometric center "M" may be located to the left or right of the central joint, which is indicated by "±A." Moreover, the control arms 2.1, 2.2 of the steering triangle have different lengths.

In the embodiment according to FIG. 2, the central joint is mounted truly axially, i.e., the offset equals zero here. The peculiarity of this vehicle axle is the vertically arranged molecular joints 2.4 and 2.5 present at the ends of the control arms 2.1, 2.2.

FIG. 3 shows another advantageous embodiment of the present invention. The fastening pins 7 and 8 of the central joint 2.3 now have elongated holes 7.1 and 8.1, which make it possible to compensate tolerances and to simplify the mounting of the steering triangle on the axle. According to the present invention, the mounting of the central joint is not limited to the connection to the vehicle axle shown in FIG. 3. The fastening pins of the central joint and of the guiding joints may rather be arranged not only axially in parallel to the horizontal axis 12, but, e.g., also vertically to this or in any desired angular position.

Figure 4:
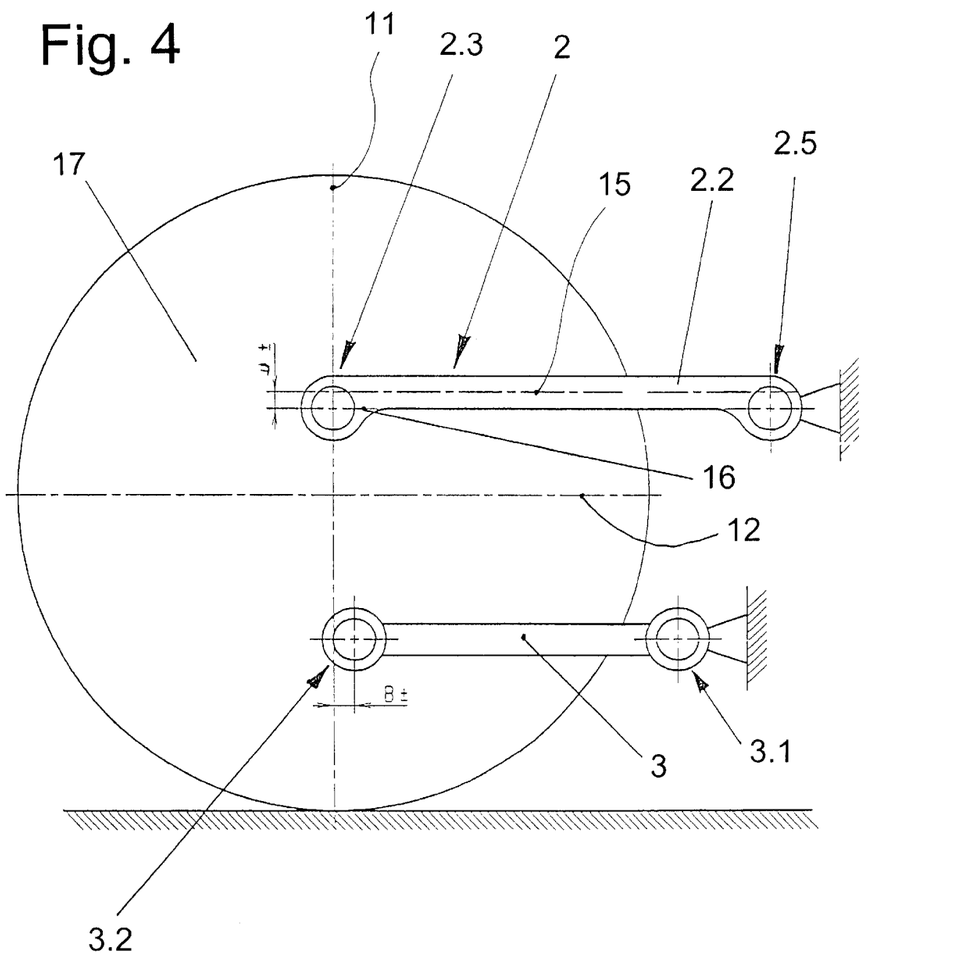
FIG. 4 is a side view showing an axle suspension of a rigid axle according to the present invention, with a steering triangle having a right-angle bend.
Figure 5:
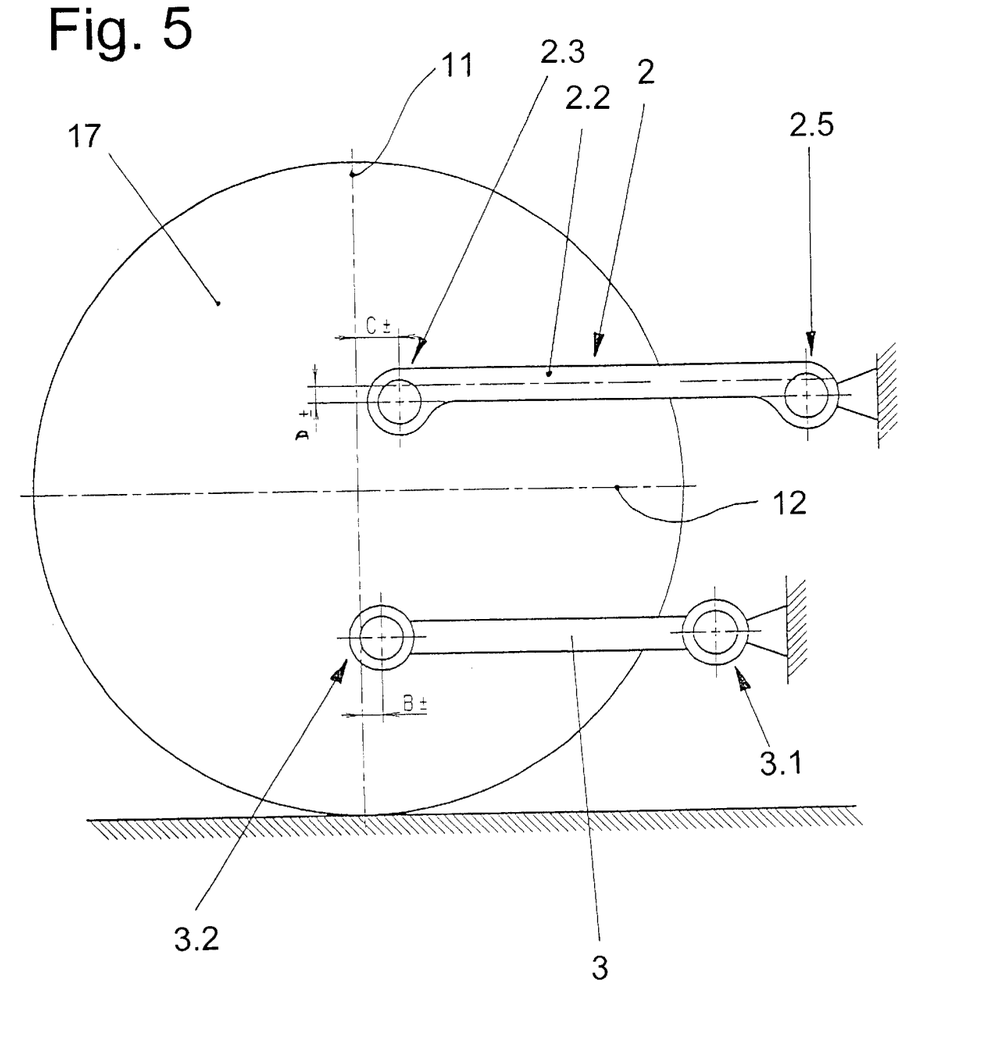
FIG. 5 is a side view showing another axle suspension of a rigid axle according to the present invention, with a steering triangle having a right-angle bend.
Figure 6:
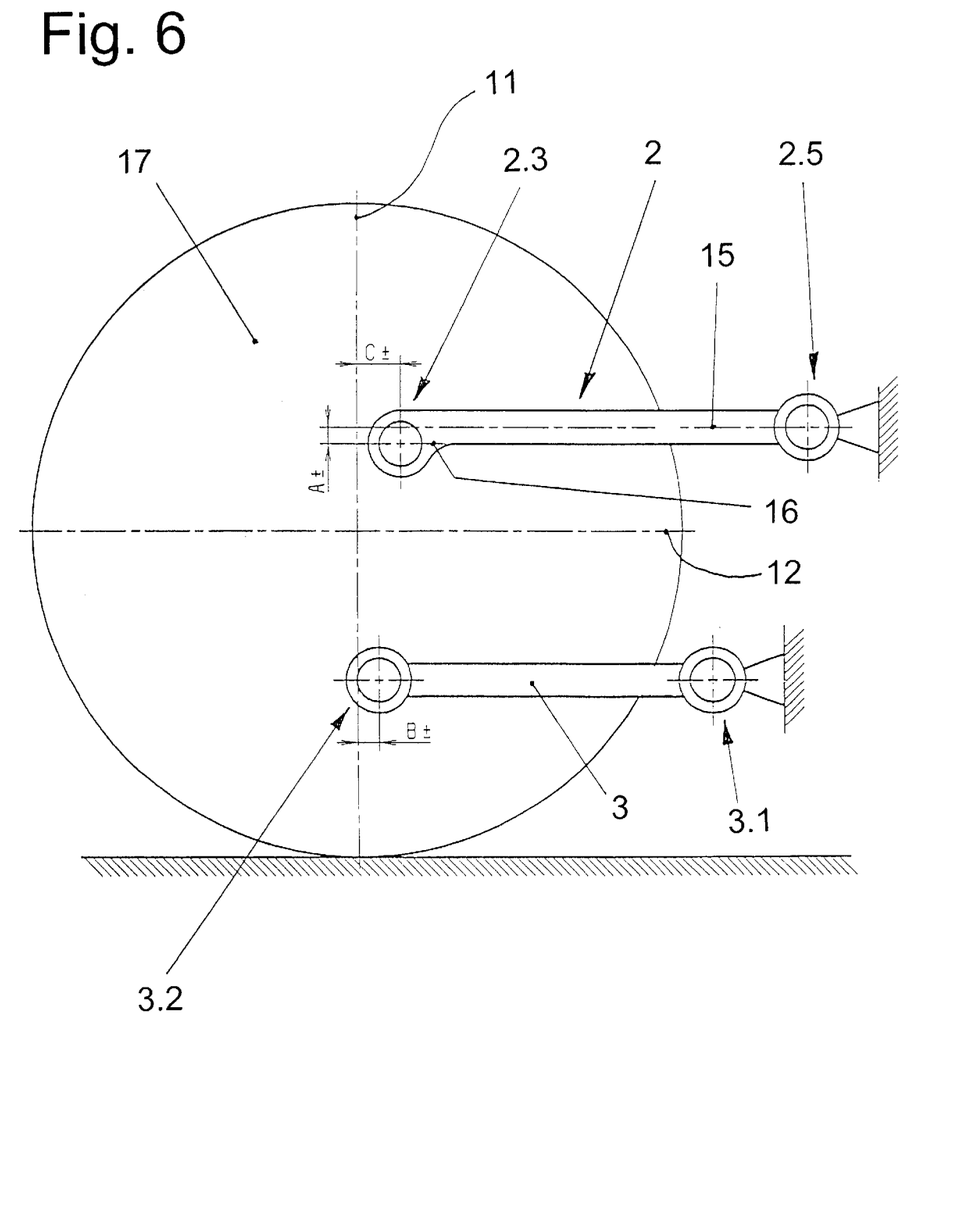
FIG. 6 is a side view showing another axle suspension of a rigid axle according to the present invention, with a steering triangle having a right-angle bend.
Figure 13:
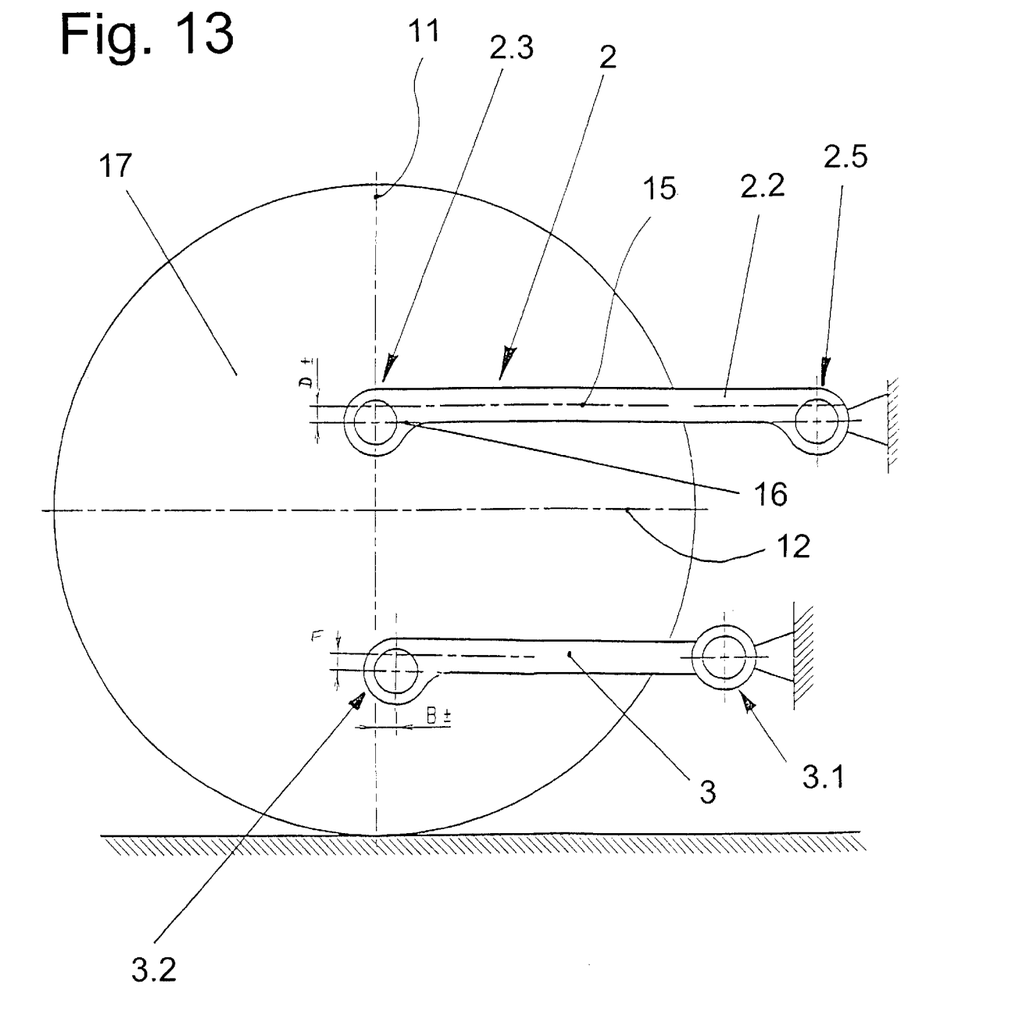
FIG. 13 is a side view showing an axle suspension of a rigid axle according to the present invention with a steering triangle having a right-angle bend as well as a longitudinal control arm having, a right-angle bend.

FIGS. 4 through 6 schematically show various possible axle embodiments according to the present invention. In the embodiment according to FIG. 4, the longitudinal control arms 3, 4 have an offset "B" from the vertical axis 11. Consequently, they are arranged offset to the front when viewed in the direction of travel. The steering triangle 2 is bent at a right angle on both sides, so that the central axis 16 of the guiding joint has a distance "D" (offset) from the central longitudinal axis 15 of the steering triangle. In the embodiment according to FIG. 13, the longitudinal control arms 3,4 have been offset a distance "B" from the vertical axis 11 and also are bent at a right angle so that there is an offset "F" from a central axis of the joint "3.2 or 4.2" and the central axis of the longitudinal control arm 25.

Moreover, the steering triangle 2 is mounted on the axle body 1 with an offset "C" from the vertical axis 11 in FIG. 5.

In the embodiment according to FIG. 6, the steering triangle is bent at a right angle on one side only and the design of this axle suspension is otherwise identical to that shown in FIG.5

Figure 7:
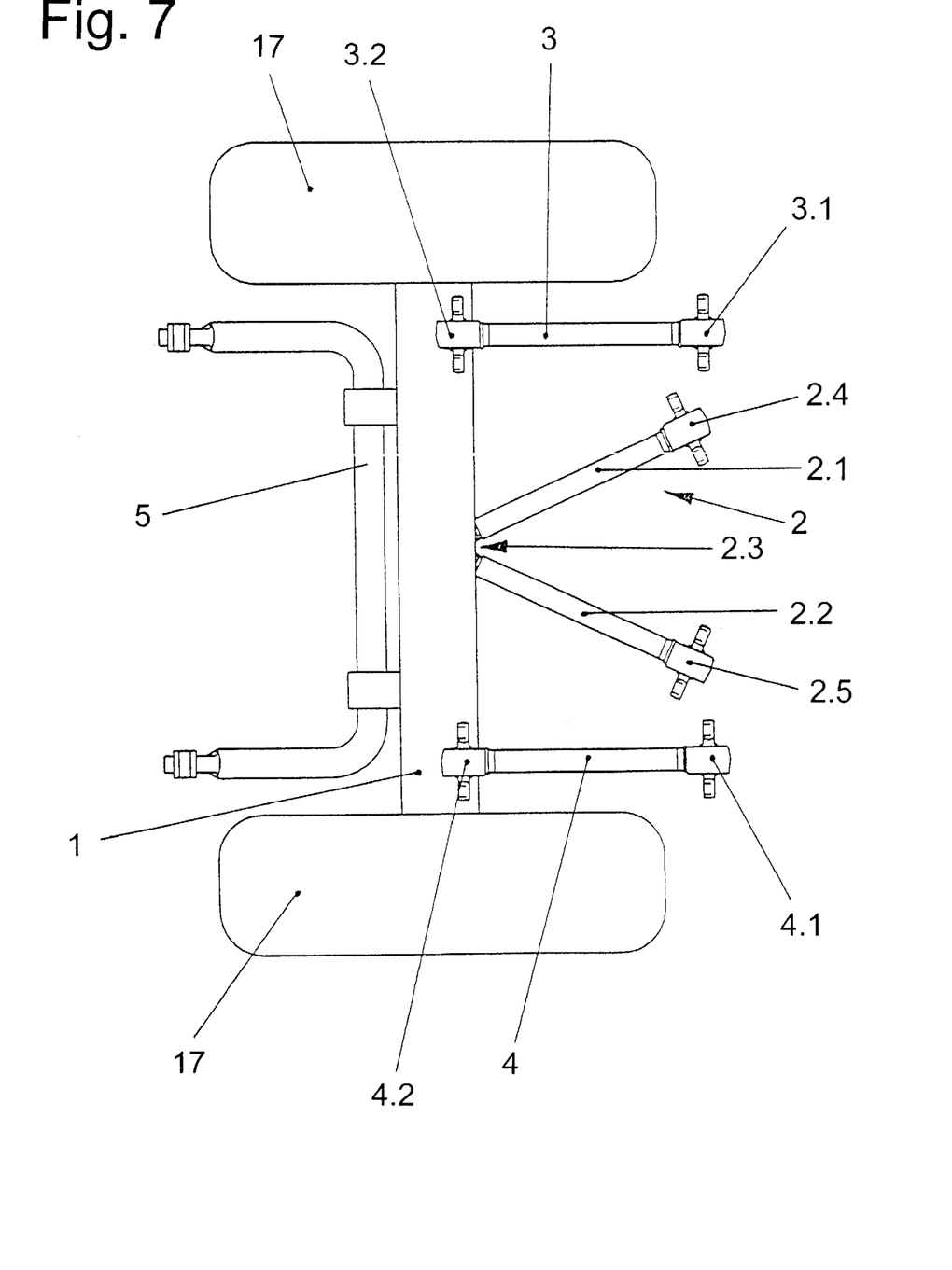
FIG. 7 is a top view showing another embodiment of a rigid vehicle axle according to the present invention with the steering triangle fastened under the axle body.

FIG. 7 shows the design of a vehicle axle according to the present invention for low-platform vehicles. The steering triangle 2 is mounted under the vehicle axle, while the longitudinal control arms 3, 4 are fixed above same. This design makes it possible to save a considerable amount of installation space. These vehicles can be lower than conventional ones.

Figure 8:
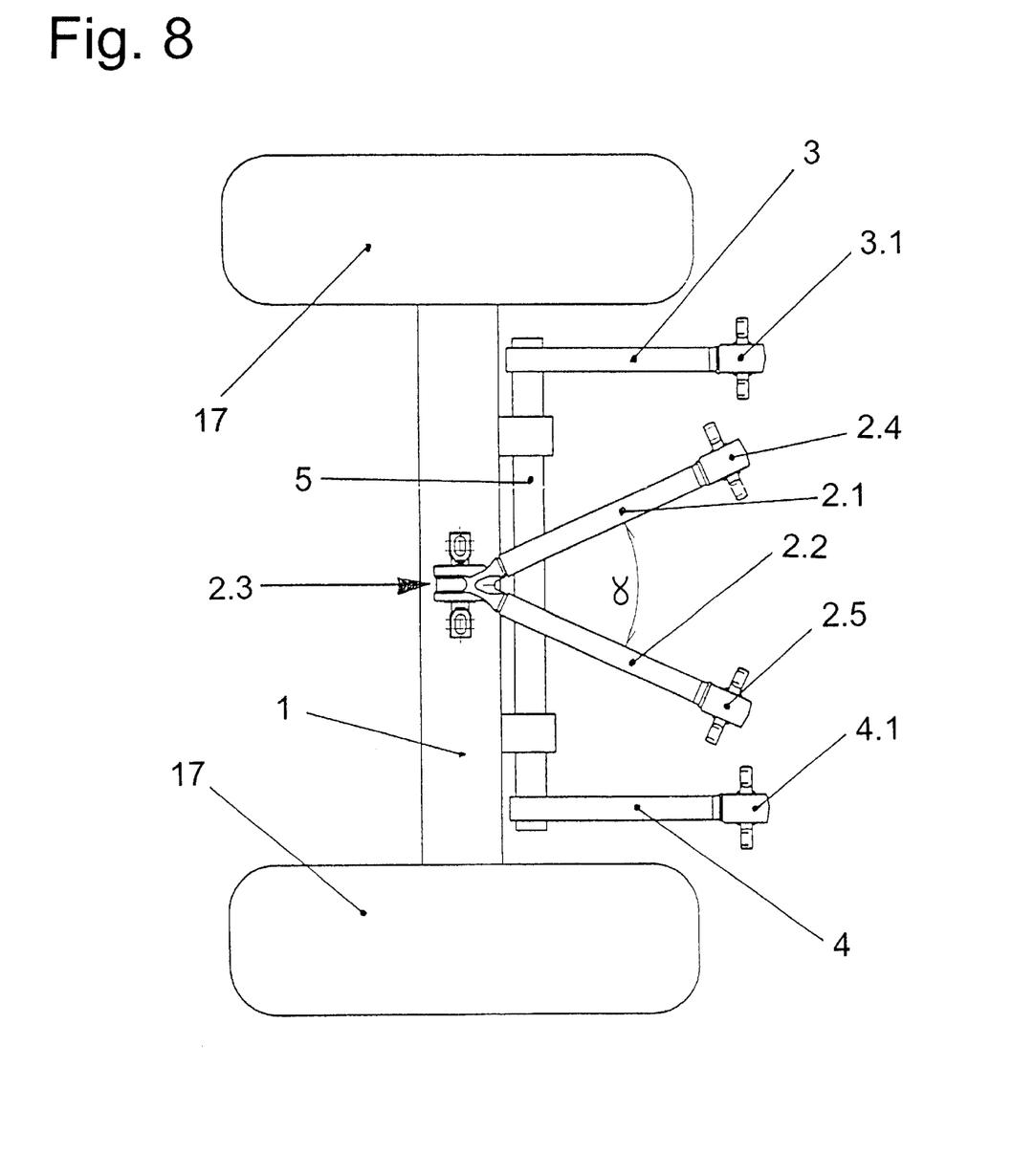
FIG. 8 is a top view showing another embodiment of a rigid vehicle axle according to the present invention with the steering triangle fastened above the axle body.

In FIG. 8, the stabilizing device 5 is integrated by being mounted in the longitudinal control arms 3, 4. A one-part design of the longitudinal control arms and of the stabilizing device may, of course, be used as well. The vehicle axle becomes very narrow due to such a design, because all stabilizing components can be arranged on one side, while the effort needed for mounting is reduced at the same time and the number of components can be reduced on the whole.

FIGS. 9 through 11 once again show embodiments of various molecular joints as they can be used in each of the described joints of an axle according to the present invention.

Figure 9:
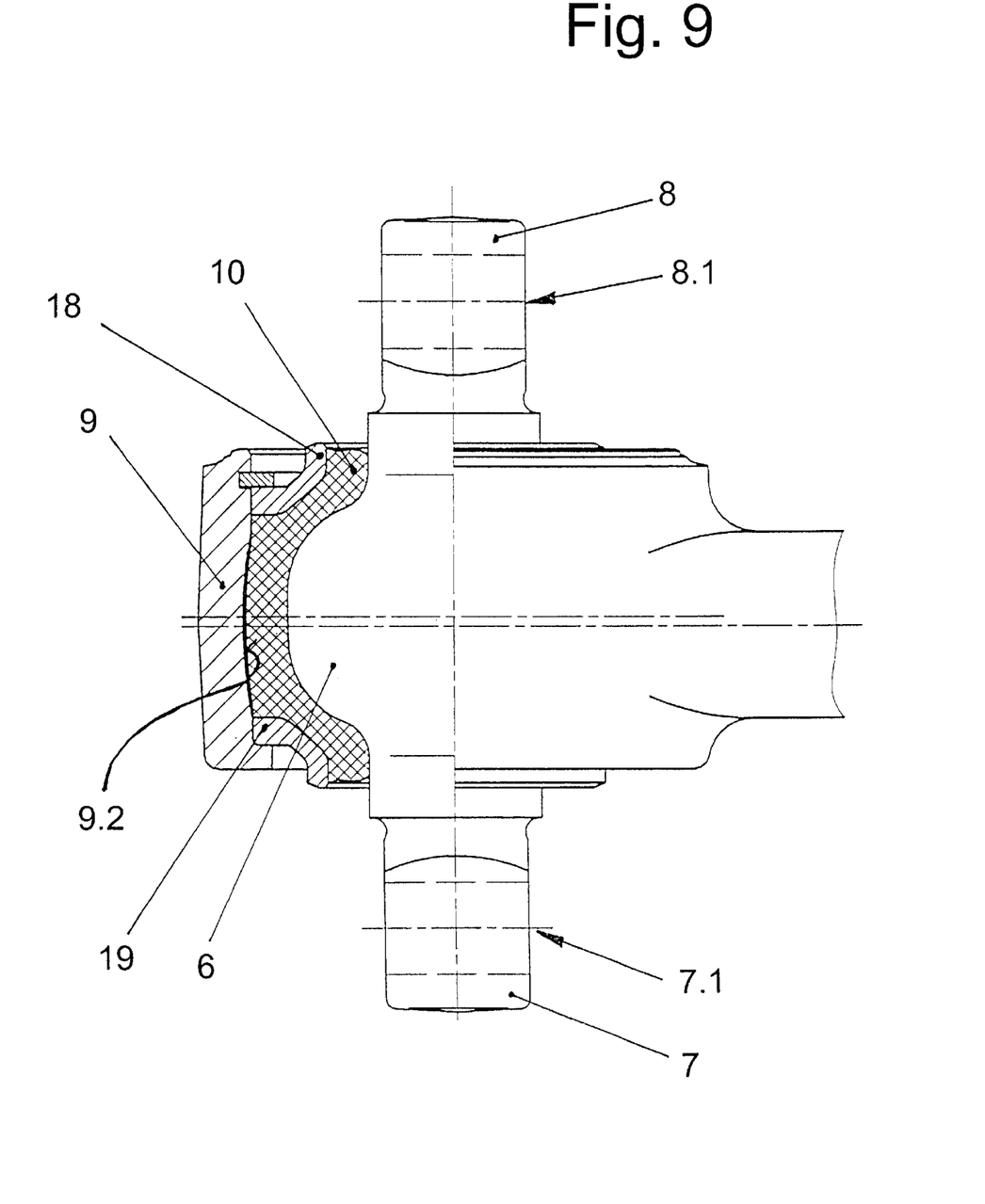
FIG. 9 is a partial sectional view showing a section through an embodiment of a molecular.joint as it is used in an axle suspension according to the present invention.

The molecular joint in FIG. 9 has a housing 9 with a recess 9.2 arranged inside the main load zone. The radial direction is to be considered to be the main direction of load. The inner part 6 is a ball piece. A thicker rubber layer is applied between the inner wall 9.2 of the housing and the ball surface due to the recess 9.2 in the joint housing 9, immediately in the equatorial area. Since the rubber possesses damping properties, i.e., it is "soft," such a joint has a softer spring characteristic at the beginning of its radially acting load. However, the more the rubber is compressed, the more strongly will it be pressed against the housing wall. The joint characteristic thus becomes harder with increasing radial spring travel.

Figure 10:
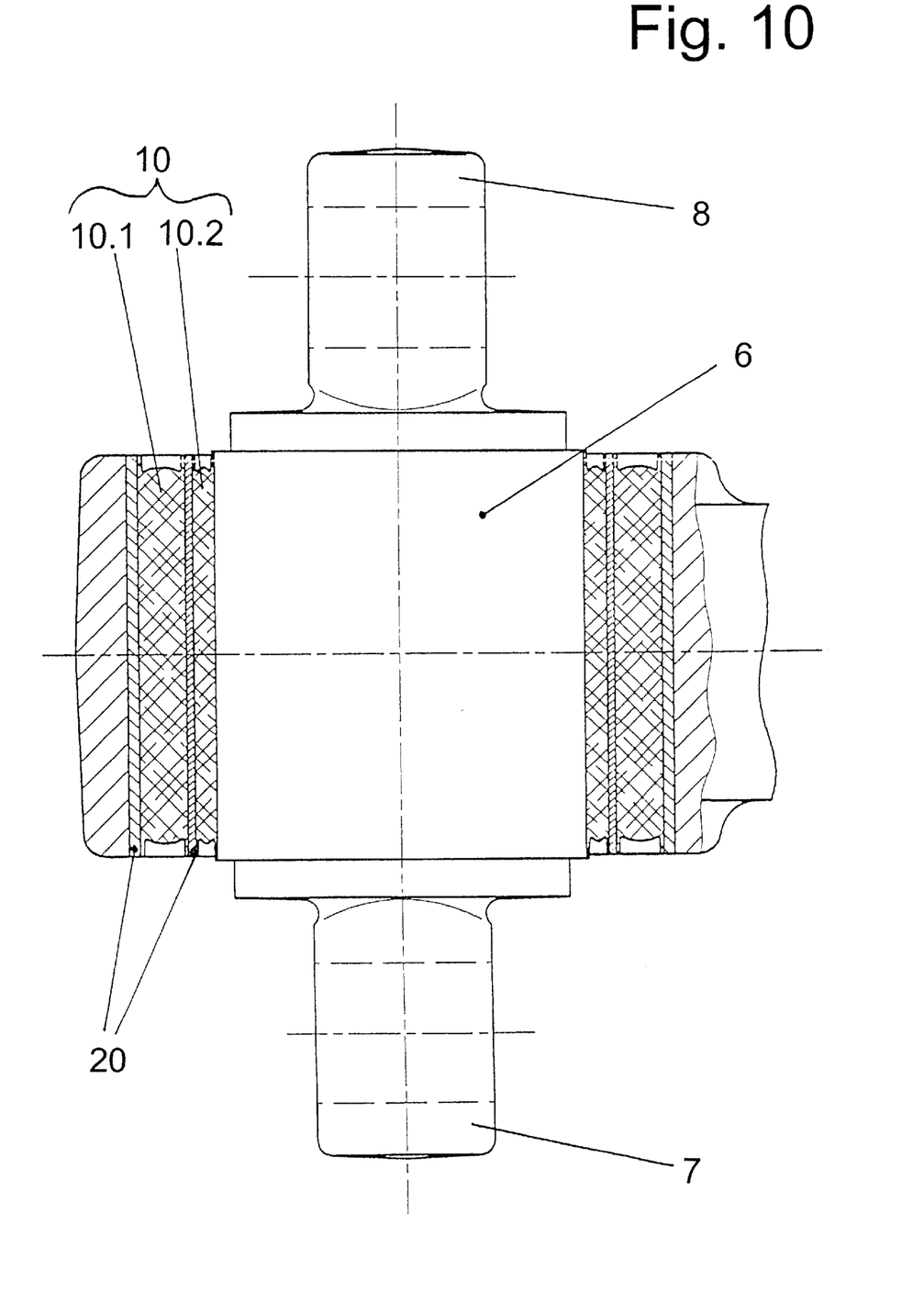
FIG. 10 is a sectional view showing a section through another embodiment of a molecular joint as it is used in an axle suspension according to the present invention.

The molecular joint in FIG. 10 is a joint consisting of a plurality of elastomer layers 10.1 and 10.2. Inserts 20 consisting of metal or plastic, which affect the mounting characteristic, are introduced between the elastomer layers. These inserts 20 may in turn have recesses. The inner part 6 has a cylindrical design in this joint.

Figure 11:
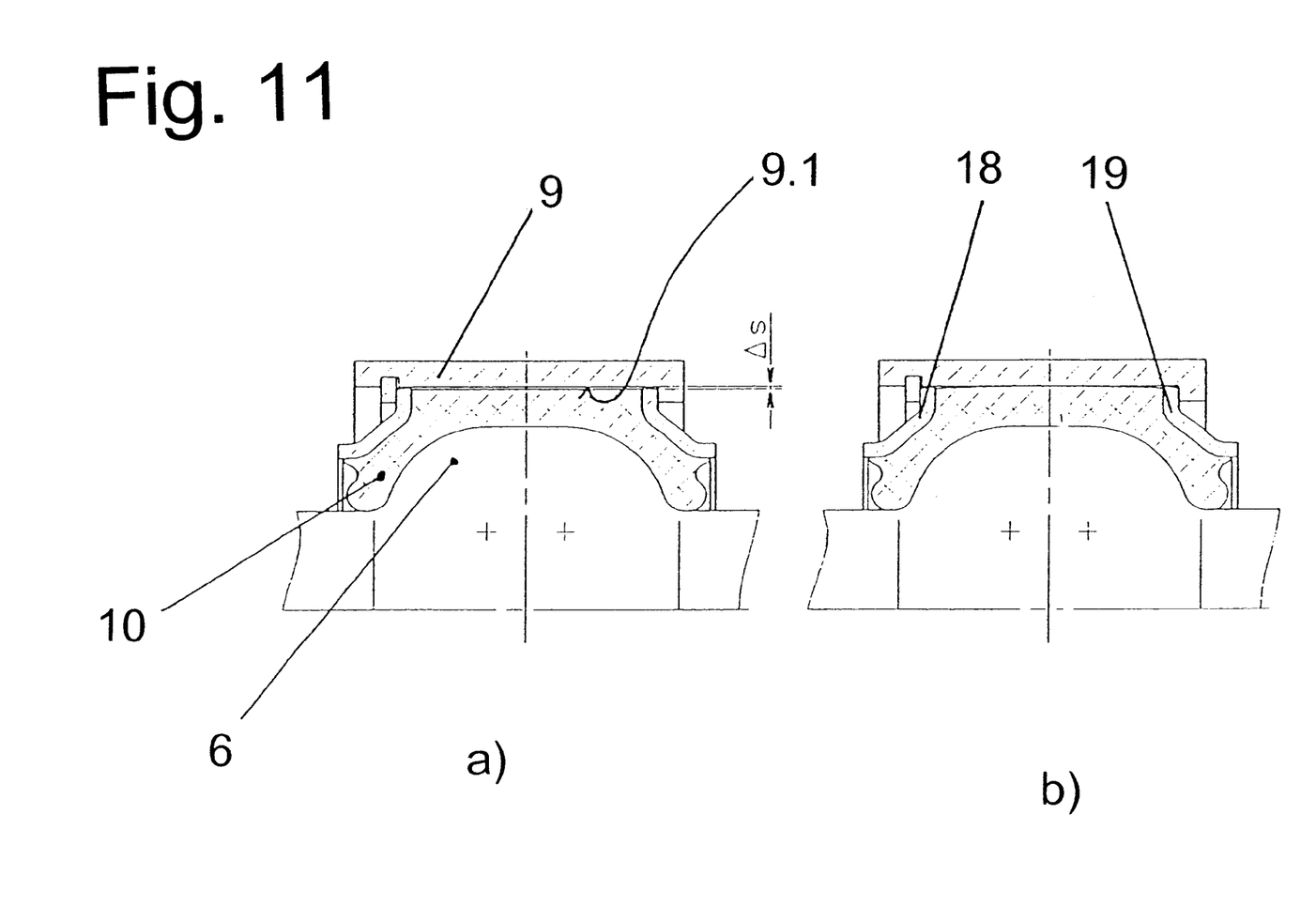
FIG. 11A is a sectional view showing a section through another embodiment of a molecular joint as it is used in an axle suspension according to the present invention.
FIG. 11B is a sectional view showing a section through the embodiment of the molecular joint of FIG. 11A as it is used in an axle suspension according to the present invention and showing the crowned jacket surface geometry.

The guiding joint shown in FIG. 11 comprises a metallic housing 9 with a cylindrical inner jacket 9.1, a metallic, spherical inner part 6 and an elastomer body 10 arranged between the two, which compensates axial, radial and cardiac movements of the housing and of the inner part relative to one another by molecular deformation.

The elastomer body 10 cooperating with the cylindrical inner jacket 9.1 of the housing radially in the outward direction is arranged adheringly on the inner part and is also axially pretensioned between sheet metal rings 18, 19. It has a crowned jacket surface geometry centrally all around and a fitted jacket surface geometry next to it on both sides all around in the preassembled, axially stress-free state, wherein the external diameter of the sheet metal rings has an undersize compared with the internal diameter of the inner jacket 9.1 of the housing. A sliding surface on the circumference of the elastomer body, which sliding surface is formed under the axial tensioning and cooperates with the cylindrical inner jacket surface of the housing, allows a rotary movement of the inner part in the housing, so that the inner part slips through under overload.

Figure 12:
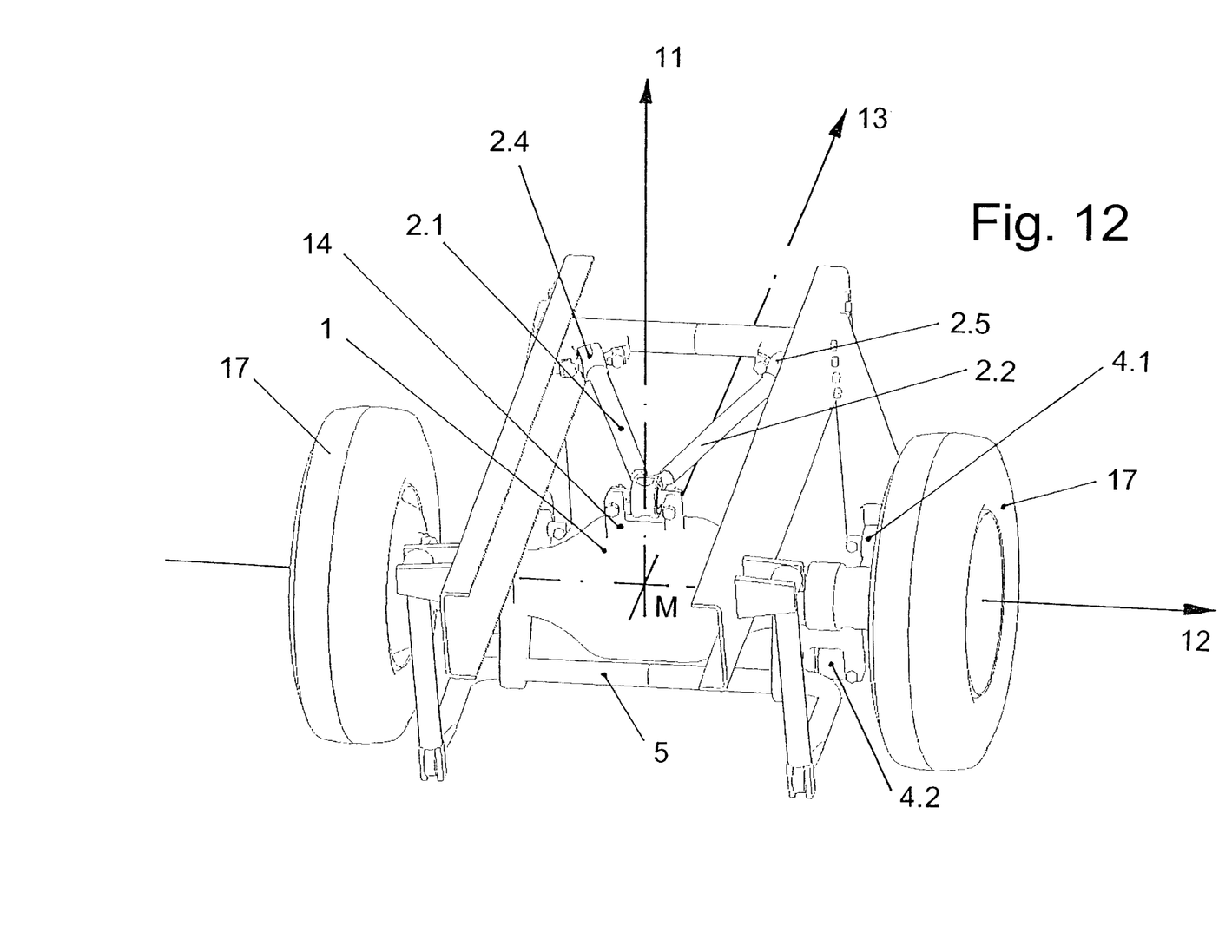
FIG. 12 is a three-dimensional view of an axle suspension according to the present invention.

FIG. 12 shows a three-dimensional representation of an axle suspension of rigid axles according to the present invention. The axes of coordinates formed by the axes 11, 12 and 13 are shown in the figure. The steering triangle 2 is mounted, e.g., truly centrally on the mounting flange 14. The offset of the steering triangle is present here only relative to the horizontal axes 12 and 13, but its value is zero relative to axis 11. The intersection of the axes 11, 12 and 13 is designated by "M" in FIG. 12.

While specific embodiments of the invention have been shown and described in detail to illustrate the application of the principles of the invention, it will be understood that the invention may be embodied otherwise without departing from such principles.

What is claimed is:

1. An axle suspension of a rigid axle, on an axle body, the axle suspension comprising:
   a steering triangle with a central joint and two control arms, said steering triangle control arms forming an angle with one another and being each respectively fastened to said central joint at one end and connected to a vehicle body via a guiding joint at another end;
   two longitudinal control arms located at spaced locations from the steering triangle and having a different vertical position from the steering triangle, each of said two longitudinal control arms being connected to a respective longitudinal control arm joint;
   a stabilizing device, geometric axes of coordinates being defined for the axle suspension including a first horizontal axis extending in a transverse direction of the vehicle and forming a central axis of the axle body, a second horizontal axis extending in the center of the vehicle and in a longitudinal direction of the vehicle and intersecting said first horizontal axis at light angles at an intersection, and a vertical axis intersecting said intersection, at least one of said central joint of said steering triangle and the respective longitudinal control arm joint of at least one of said longitudinal control arms being mounted on said axle body with an offset in relation to at least one of said first horizontal axis, said second horizontal axis and said vertical axis, wherein at least one of said longitudinal control arms is bent at a right angle in the vicinity of the respective longitudinal control arm joint or at least one of said control arms of said steering triangle is bent at a right angle in the vicinity of the central joint, so that a longitudinal central axis of the control arm and a central axis of the central joint are offset from one another in space or one of the longitudinal control arms and the respective longitudinal control arm joint are offset from one another in space.

2. An axle suspension of rigid axles in accordance with claim 1, wherein each of said central joint of said steering triangle and the respective longitudinal control arm joints is a molecular joint, said molecular joint comprising a housing, a metallic inner part with fastening pins projecting from said housing on both sides and a molecularly deformable elastomer body adhering to said metallic inner part and said housing, said molecularly deformable elastomer body being arranged between said housing and said metallic inner part by two adhesive connections, wherein at least one of said two adhesive connections slips through when a maximum allowable shear stress is exceeded.

3. An axle suspension of rigid axles in accordance with claim 1, wherein at least one of said central joint and said respective longitudinal control arm joints is a slide bearing or a pivoting slide bearing.

4. An axle suspension of rigid axles in accordance with claim 1, further comprising: a mounting flange made in one piece with said axle body.

5. An axle suspension of rigid axles in accordance with claim 4, wherein said central joint of said steering triangle is detachably connected to said mounting flange of the axle body.

6. An axle suspension of rigid axles in accordance with claims 5, wherein the connection between said mounting flange and said central joint is a screw connection.

7. An axle suspension of rigid axles in accordance with claim 6, wherein said central joint has fastening pins with elongated holes to compensate tolerances.

8. An axle suspension of rigid axles in accordance with claim 1, wherein said central joint is a molecular joint which comprises a metallic inner part and a molecularly deformable elastomer body, said inner part being fixed on the axle body axially in parallel to said first horizontal axis.

9. An axle suspension of rigid axles in accordance with claim 2, wherein at least one of the molecular joints is arranged on the vehicle coaxially or axially in parallel to said vertical axis or, projected into a common plane, it forms an angle with said vertical axis.

10. An axle suspension of rigid axles in accordance with claim 2, wherein at least one of the molecular joints comprises an cylindrical inner jacket of said housing, said elastomer body cooperates with said cylindrical inner jacket radially in the outward direction, said elastomer body being arranged adheringly on the inner jacket and is axially pretensioned between sheet metal rings and has a crowned jacket surface geometry centrally all around and a fitted jacket surface geometry next to it on both sides all around in the preassembled, axially stress-free state, wherein the external diameter of said sheet metal rings is undersized compared with the internal diameter of said inner jacket of the housing and a sliding surface on the circumference of the elastomer body, which sliding surface is formed under the axial tensioning and cooperates with the cylindrical inner jacket surface of the housing, allows a rotary movement of the inner part in the housing, so that the inner part slips through under overload.

11. An axle suspension of rigid axles in accordance with claim 2, wherein said housing of at least one of said molecular joints is provided with an inner recess arranged within a main load zone and has a ball piece as said inner part.

12. An axle suspension of rigid axles in accordance with claim 2, wherein said joint of said steering triangle is a molecular joint, said molecular joint comprising a housing, a metallic inner part with fastening pins projecting from said housing on both sides and a molecularly deformable elastomer body adhering to said metallic inner part and said housing, said molecularly deformable elastomer body being arranged between said housing and said metallic inner part, said elastomer body being a multilayer elastomer body arranged between said housing and said inner part.

13. An axle suspension of rigid axles in accordance with claim 2, wherein at least one of said molecular joints has a cylindrical inner part.

14. An axle suspension of rigid axles in accordance with claims 1, wherein said steering triangle is a one-part component formed of plastic, plastic composite, magnesium, aluminum or steel, having mounts, prepared to receive molecular joints as inserts.

15. An axle suspension of rigid axles in accordance with claim 1, wherein said control arms of said steering triangle have different lengths.

16. An axle suspension of rigid axles in accordance with claim 1, wherein an angle ($\alpha$) between said control arms of said steering triangle is greater than 60°.

17. An axle suspension of rigid axles in accordance with claim 1, wherein said steering triangle is fastened under the axle body.

18. An axle suspension of rigid axles in accordance with claim 8, wherein said steering triangle comprises two control arms connected to one another in the area of said central joint.

19. An axle suspension of a rigid axle, on the axle body, the axle suspension comprising:
   a steering triangle with a central joint and two control arms, said steering triangle control arms forming an angle with one another and being each respectively fastened to said central joint at one end and connected to a vehicle body via a guiding joint at another end;

two longitudinal control arms located at spaced locations from the steering triangle and having different vertical positions;

a stabilizing device, geometric axes of coordinates being defined for the axle suspension including a first horizontal axis extending in a transverse direction of the vehicle and forming a central axis of the axle body, a second horizontal axis extending in the center of the vehicle and in a longitudinal direction of the vehicle and intersecting said first horizontal axis at right angles at an intersection, and a vertical axis intersecting said intersection, at least one of said central joint of said steering triangle and a fastening of at least one of the said longitudinal control arms being mounted on said axle body with an offset in relation to at least one of said first horizontal axis, said second horizontal axis and said vertical axis, wherein said control arms of said steering triangle arc bent at a right angle in the vicinity of the central joint, so that a longitudinal central axis of the control arms and a central axis of the central joint are offset from one another in space.

* * * * *